(12) United States Patent
Fukuyama et al.

(10) Patent No.: US 8,177,250 B2
(45) Date of Patent: May 15, 2012

(54) MOTORCYCLE BODY COVER STRUCTURE AND MOTORCYCLE INCORPORATING SAME

(75) Inventors: Kei Fukuyama, Saitama (JP); Takamasa Kojima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 359 days.

(21) Appl. No.: 12/459,659

(22) Filed: Jul. 6, 2009

(65) Prior Publication Data

US 2010/0001551 A1    Jan. 7, 2010

(30) Foreign Application Priority Data

Jul. 7, 2008    (JP) .................................. 2008-177150

(51) Int. Cl.
*B62J 9/00*        (2006.01)
*B62D 25/08*    (2006.01)
*B62K 11/00*    (2006.01)
(52) U.S. Cl. ...................... 280/288.4; 296/192; 180/229
(58) Field of Classification Search .................... 180/219, 180/89.1, 229; 280/288.2, 288.4, 847; 296/77.1, 296/80, 81, 82, 83, 91, 192, 203.02, 78.1; 293/105
See application file for complete search history.

(56) References Cited

U.S. PATENT DOCUMENTS

| | | | | |
|---|---|---|---|---|
| 4,019,774 A * | 4/1977 | Tsukahara et al. | ........... | 296/78.1 |
| 4,354,570 A * | 10/1982 | Tanaka et al. | ................. | 180/219 |
| 5,107,949 A * | 4/1992 | Gotoh et al. | ................... | 180/219 |
| 6,905,160 B2 * | 6/2005 | Yoshida et al. | .............. | 296/78.1 |
| 7,007,998 B2 * | 3/2006 | Toyofuku | ...................... | 296/78.1 |
| 7,325,639 B2 * | 2/2008 | Yamaguchi et al. | .......... | 180/219 |
| 7,510,229 B2 * | 3/2009 | Katagiri et al. | .............. | 296/78.1 |
| 7,520,359 B2 * | 4/2009 | Iwanaga | ........................ | 180/219 |
| 7,556,115 B2 * | 7/2009 | Iwanaga | ........................ | 180/229 |
| 7,967,337 B2 * | 6/2011 | Misaki et al. | .................. | 280/781 |
| 2002/0153187 A1 * | 10/2002 | Tsukui et al. | .................. | 180/219 |
| 2003/0132048 A1 * | 7/2003 | Hata | .............................. | 180/219 |
| 2007/0024089 A1 * | 2/2007 | Takeshita | ...................... | 296/192 |

FOREIGN PATENT DOCUMENTS

| | | | | |
|---|---|---|---|---|
| JP | 01275282 A | * | 11/1989 | |
| JP | 02053681 A | * | 2/1990 | |
| JP | 2006-015930 | | 1/2006 | |
| JP | 2009161027 A | * | 7/2009 | |

* cited by examiner

*Primary Examiner* — Joanne Silbermann
*Assistant Examiner* — Daniel Yeagley
(74) *Attorney, Agent, or Firm* — Carrier Blackman & Associcates, P.C.; William D. Blackman; Joseph P. Carrier

(57) ABSTRACT

A body cover structure of a motorcycle includes an upper cover arranged at a position above a front wheel operatively attached to a lower end of a front fork steerably supported by a head pipe at a front end of a body frame, and a pair of right and left cowls that cover at least a portion of a fuel tank mounted on the body frame. The upper cover includes a covering portion for covering a portion of a fuel tank, and each overhanging portion including a ridge line portion that ranges to a lower end of the upper cover, when viewed in a side view, is provided with a respective cowl connected to the upper cover with a portion of each cowl overlapped with the rear of the upper cover, such that the overhanging portion extends outwardly beyond the upper cover in a vehicle-width direction.

20 Claims, 13 Drawing Sheets

MOTORCYCLE BODY COVER STRUCTURE AND MOTORCYCLE INCORPORATING SAME

CROSS-REFERENCE TO RELATED APPLICATIONS

The present invention claims priority under 35 USC 119 based on Japanese patent application No. 2008-177150, filed on Jul. 7, 2008. The entire subject matter of this priority document, including specification claims and drawings, is incorporated by reference herein.

BACKGROUND OF THE INVENTION

1. Field of the Invention

The present invention relates to a body cover structure for a motorcycle, and to a motorcycle incorporating the same. More particularly, the present invention relates to a motorcycle body cover structure provided with an upper cover arranged at a position above a front wheel, which is operatively attached to a lower end of a front fork steerably supported by a head pipe arranged at a front end of a body frame. The body cover structure also includes a pair of right and left cowls that cover at least a portion of a fuel tank mounted on the body frame behind the head pipe.

2. Description of the Background Art

There is a known body cover structure for a motorcycle, for example, such as the body cover structure disclosed in Japanese Patent document JP-A No. 2006-15930.

However, in the body cover structure disclosed in Japanese Patent document JP-A No. 2006-15930, the upper cover is attached to a top bridge of the front fork, and cowls that each respectively cover a side portion of the fuel tank from are separated from one another. Therefore, during operation of the motorcycle, it is difficult to acquire the effect of rectification for smoothly diverting (conducting) running wind rearwardly causing air resistance easily.

The present invention has been made to overcome such drawbacks of existing body cover structure for a motorcycle. Accordingly, it is one of the objects of the present invention to provide the body cover structure of a motorcycle where the effect of rectification is enhanced by reducing air resistance and smoothly conducting running wind rearwardly so as to reduce air resistance during running operation of the motorcycle.

SUMMARY OF THE INVENTION

In order to achieve the above objects, the present invention according to a first aspect thereof provides a body cover structure for a motorcycle. The body cover structure includes an upper cover arranged at a position located above a front wheel operatively attached to a lower end of a front fork steerably supported by a head pipe at a front end of a body frame, and a pair of right and left cowls that cover at least a portion of a fuel tank mounted on the body frame rear of the head pipe.

The present invention according to the first aspect thereof is characterized in that the upper cover covers a portion of the fuel tank on both sides thereof, and an overhanging portion that forms a ridge line portion linearly ranging to a lower edge of the upper cover, when viewed in a side view, is provided in each cowl detachably connected to the upper cover with a part of each cowl overlapped with the rear of the upper cover and extending outside beyond the cover in a vehicle-width direction.

The present invention according to a second aspect thereof, in addition to the first aspect, is characterized in that the cowl is detachably attached to the rear of the upper cover, and a shroud is also provided that covers an oil cooler attached to a portion front of the body frame from the side. The cowl is coupled with an upper portion of a corresponding shroud overlapped with a lower portion on the rear side of the cowl from the outside, and an airflow routing groove is formed between the lower portion on the rear side of the cowl and the upper portion of the shroud, the airflow routing groove extended in a longitudinal direction and opening downwardly.

The present invention according to a third aspect thereof, in addition to the second aspect, is characterized in that a cutout that forms an exhaust port ranging to the airflow routing groove and vertically directed between the lower portion on the rear side of the cowl and the upper portion of the shroud is provided to the upper portion of the shroud.

The present invention according to a fourth aspect thereof, in addition to one of the first, second or third aspects, is characterized in that the overhanging portion is formed by arranging an upper inclined portion inclined to be located on above toward the inside in the vehicle-width direction and extended an upper portion on the front side of the fuel tank and a lower inclined portion inclined to be located on the downside toward the inside in the vehicle-width direction and extended to a lower portion on the front side of the fuel tank on above and on the downside of the ridge line portion so that the overhanging portion has a substantially V-type cross section and the overhanging portion is provided to the cowl.

Further, the present invention according to a fifth aspect thereof, in addition to one of the first through fourth aspects, is characterized in that a headlight cover that covers a headlight is arranged with the headlight cover protruded upwardly from an upper portion of the upper cover, and a respective concave portion, extending rearwardly and upwardly, is formed on each side of the headlight cover.

EFFECTS OF THE INVENTION

According to the present invention as disclosed in the first aspect, since the upper cover covers a portion of the fuel tank with the rear ends of both sides of the upper cover from the side, the pair of right and left cowls that cover at least a portion of the fuel tank from each side are detachably tightly connected to the upper cover with a part of each cowl overlapped with the rear of the upper cover and the overhanging portion that forms the ridge line portion linearly ranging to the lower edge of the upper cover in the side view is provided to the cowl with the overhanging portion extending outside in the vehicle-width direction, the upper cover and the cowl range, forming a streamline shape, the appearance quality can be enhanced, the effect of rectification for smoothly conducting running wind rearwardly can be acquired, and air resistance when the motorcycle is run can be reduced.

According to the present invention as disclosed in the second aspect, since the airflow routing groove extended in the longitudinal direction and open downward is formed between the lower portion of the cowl and the upper portion of the shroud coupled to the lower portion on the rear side of the cowl, running wind that gets inside the cowl and the shroud can be rectified by the airflow routing groove.

According to the present invention as disclosed in the third aspect, since the exhaust port vertically directed is formed between the lower portion of the cowl and the upper portion of the shroud coupled to the lower portion on the rear side of the cowl, a part of running wind that gets inside the cowl and the shroud is exhausted on the downside of the shroud and the residual running wind can be exhausted upward from the exhaust port. In addition, the exhaust port can be easily formed between the lower portion of the cowl and the upper portion of the shroud with simple configuration that the cut-out is only provided to the upper portion of the shroud.

According to the present invention as disclosed in the fourth aspect, since the overhanging portion provided to the cowl is formed by arranging the upper inclined portion inclined to be located on above toward the inside in the vehicle-width direction and extended to the upper portion on the front side of the fuel tank and the lower inclined portion inclined to be located on the downside toward the inside in the vehicle-width direction and extended to the lower portion on the front side of the fuel tank on above and on the downside of the ridge line portion so that the overhanging portion has the substantially V-type cross section, running wind is effectively conducted on the side of a rider by the upper inclined portion, vertically separating the running wind by the overhanging portion and enhancing the effect of rectification and the comfort of the rider can be enhanced. As the effect of rectification can be acquired by the overhanging portion of the cowl even if the shroud is removed, various improvements in vehicle appearance are possible.

Further, according to the present invention as disclosed in the fifth aspect, since the concave portion extended rearwardly and upward is formed on both sides of the headlight cover, running wind is conducted on the side of the rider by the concave portions and the comfort of the rider can be enhanced.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

An illustrative embodiment of the present invention shown in the attached drawings is described below. In the attached drawings, an upper cover 85 corresponds to the upper cover according to the illustrative embodiment of the present invention.

Figure 1:
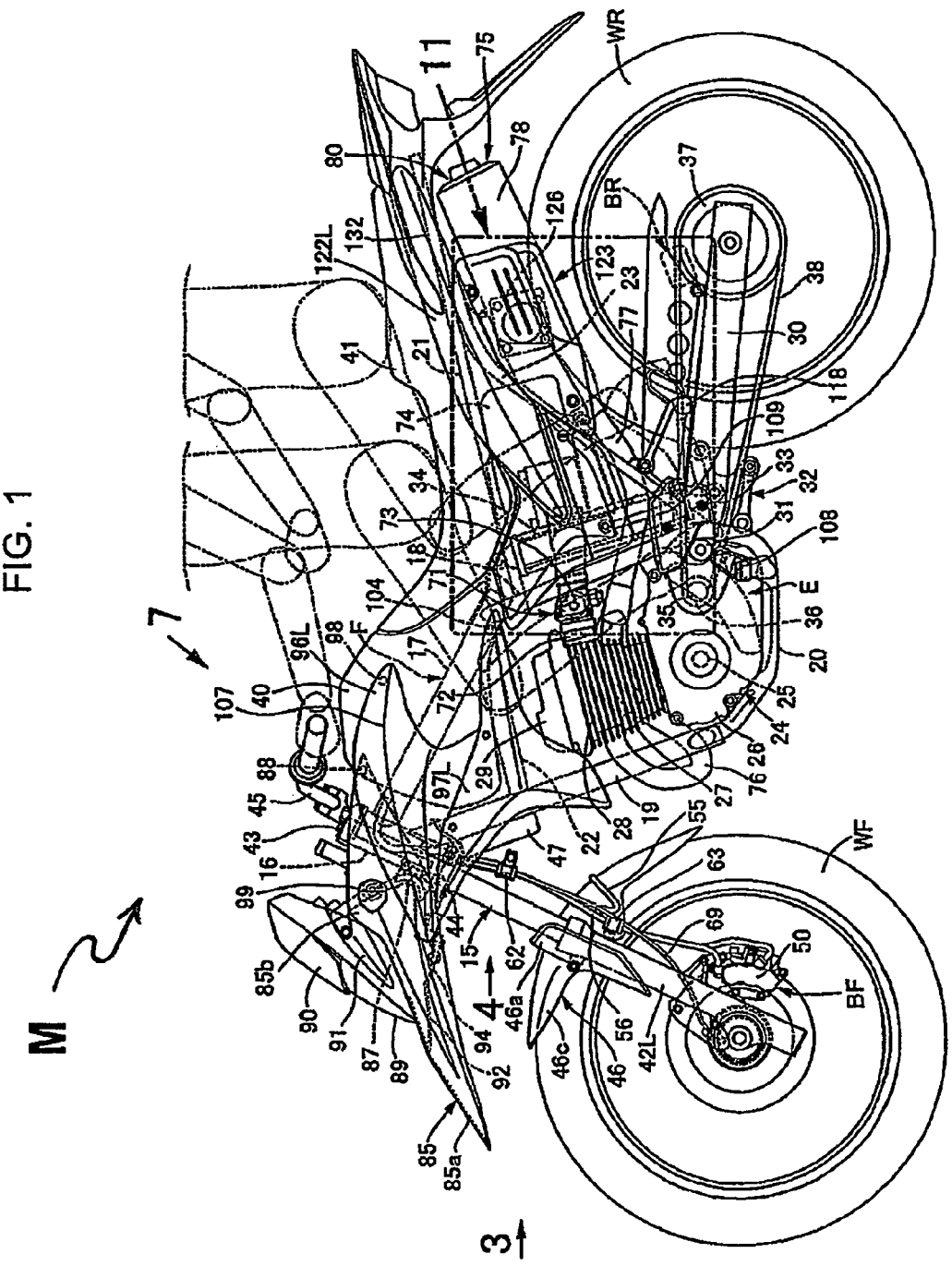
FIG. 1 is a left side view showing a motorcycle.
Figure 2:
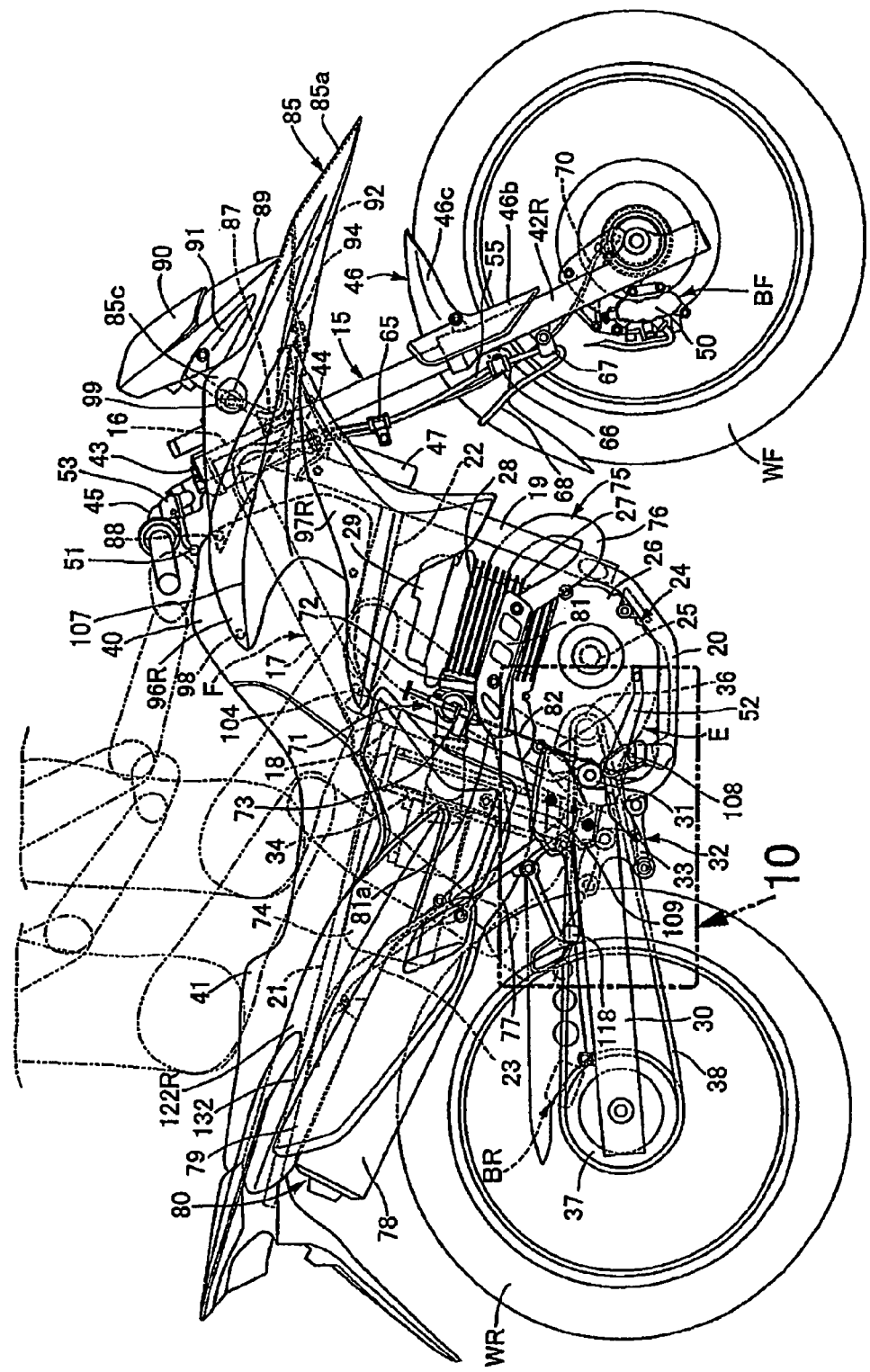
FIG. 2 is a right side view showing the motorcycle of FIG. 1.

FIGS. 1 to 13 depict a motorcycle M according to a selected illustrative embodiment of the present invention. As shown in FIGS. 1 and 2, a body frame F of the off-road motorcycle M is provided with a head pipe 16 that steerably supports front forks 15 supporting a front wheel WF via an axle at lower end thereof.

The body frame F also includes a main pipe 17 extended rearwardly and downwardly from the head pipe 16, a pair of right and left center pipes 18 extended downwardly from a rear end of the main pipe 17, and a down pipe 19 inclined at a sharper angle than the main pipe 17 and extending rearwardly and downwardly from the head pipe 16. The body frame F also includes a pair of right and left lower pipes 20 that fasten to a rear end of the down pipe 19 and each center pipe 18.

The body frame F also includes a pair of right and left seat rails 21 extended rearwardly and upwardly from an upper portion of each center pipe 18, a reinforcing pipe 22 fastening the main pipe 17 and an intermediate portion of the down pipe 19 and extended rearwardly and upward and a pair of right and left rear stays 23 fastening each lower portion of both center pipes 18 and each intermediate portion of both seat rails 21 and extended rearwardly and upwardly. Each center pipe 18 and each lower pipe 20 are integrated.

The motorcycle M is provided with an engine E. In the illustrated embodiment, the engine E is an air-cooled, single-cylinder 4-cycle engine. The engine E includes an engine body 24, which is mounted inside the body frame F and arranged so as to be enclosed by the rear of the main pipe 17, both center pipes 18, a lower portion of the down pipe 19 and both lower pipes 20. The engine body 24 is provided with a crankcase 26 that rotatably supports a crankshaft 25 having an axis oriented in a vehicle-width direction. The engine E further includes an upwardly raised cylinder block 27 connected to an upper portion of the engine body 24 on the front side of the crankcase 26, a cylinder head 28 connected to an upper end of the cylinder block 27, and a head cover 29 connected to an upper end of the cylinder head 28.

A support member 31 is provided on a lower portion of the center pipe 18. The support member 31 vertically swingably supports a front end of a swing arm 30. A rear wheel WR is supported by the rear end of the swing arm 30 via an axle. A link mechanism 32 is provided between the lower portion of the center pipe 18 and the front of the swing arm 30. A rear shock absorber 34 is provided between a link member 33 forming a portion of the link mechanism 32 and the rear end of the main pipe 17.

A gear transmission (not shown) that shifts the rotary power of the crankshaft 25 is housed in the crankcase 26. An output shaft 35 of the gear transmission is protruded sideways from a left wall of the crankcase 26. A looped chain 38 is wound onto a driving sprocket 36 fixed to an end of the output shaft 35 protruded from the crankcase 26 and onto a driven sprocket 37 coaxially provided to the rear wheel WR. The output of the gear transmission is transmitted to the side of the rear wheel WR via the chain 38.

A fuel tank 40 is mounted on the main pipe 17 at a position above the engine body 24. A tandem seat 41 is arranged at a rear of the fuel tank 40. The tandem seat 41 is supported by both seat rails 21.

Figure 3:
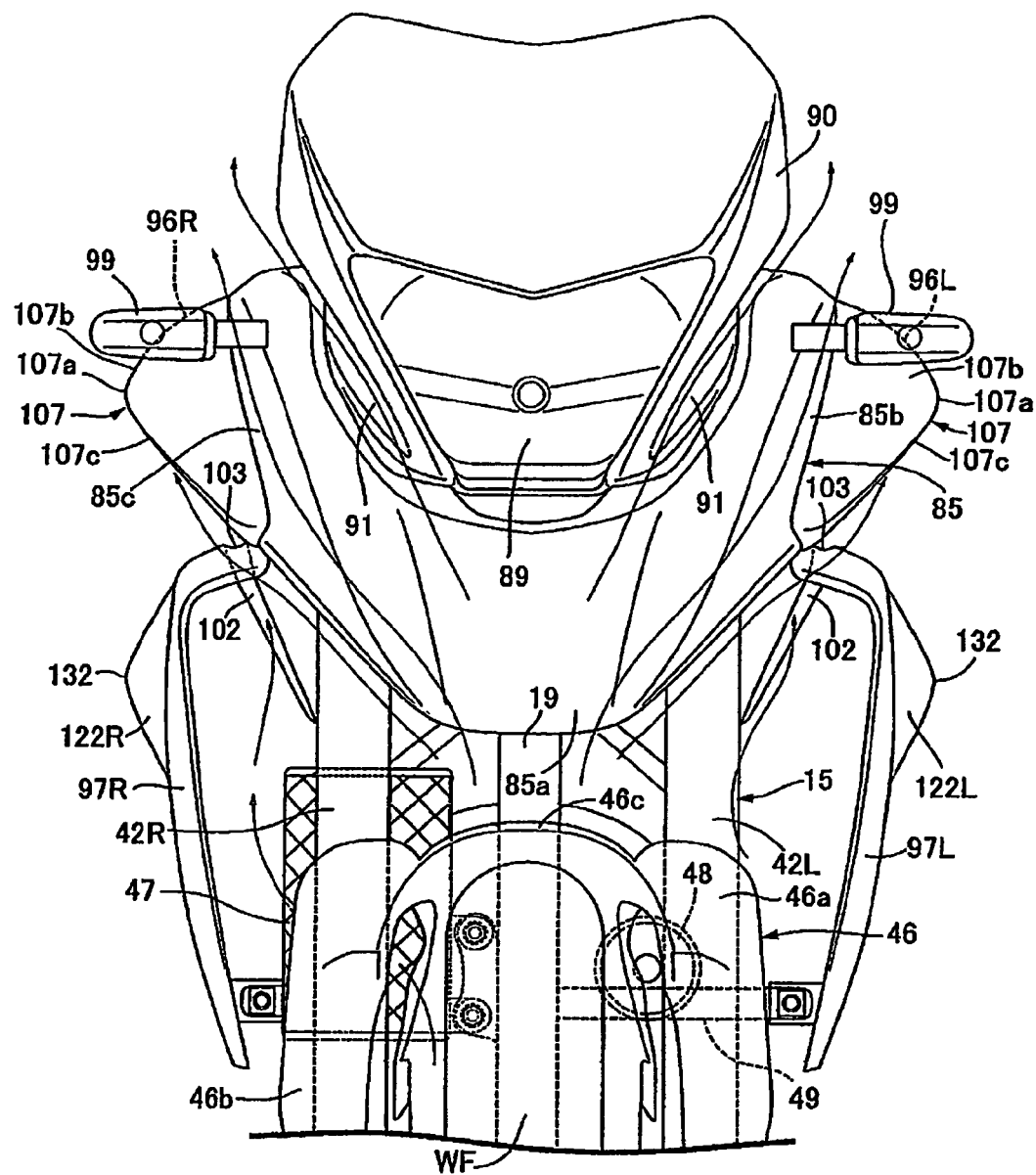
FIG. 3 is a front view viewed from a direction shown by an arrow 3 in FIG. 1.
Figure 4:
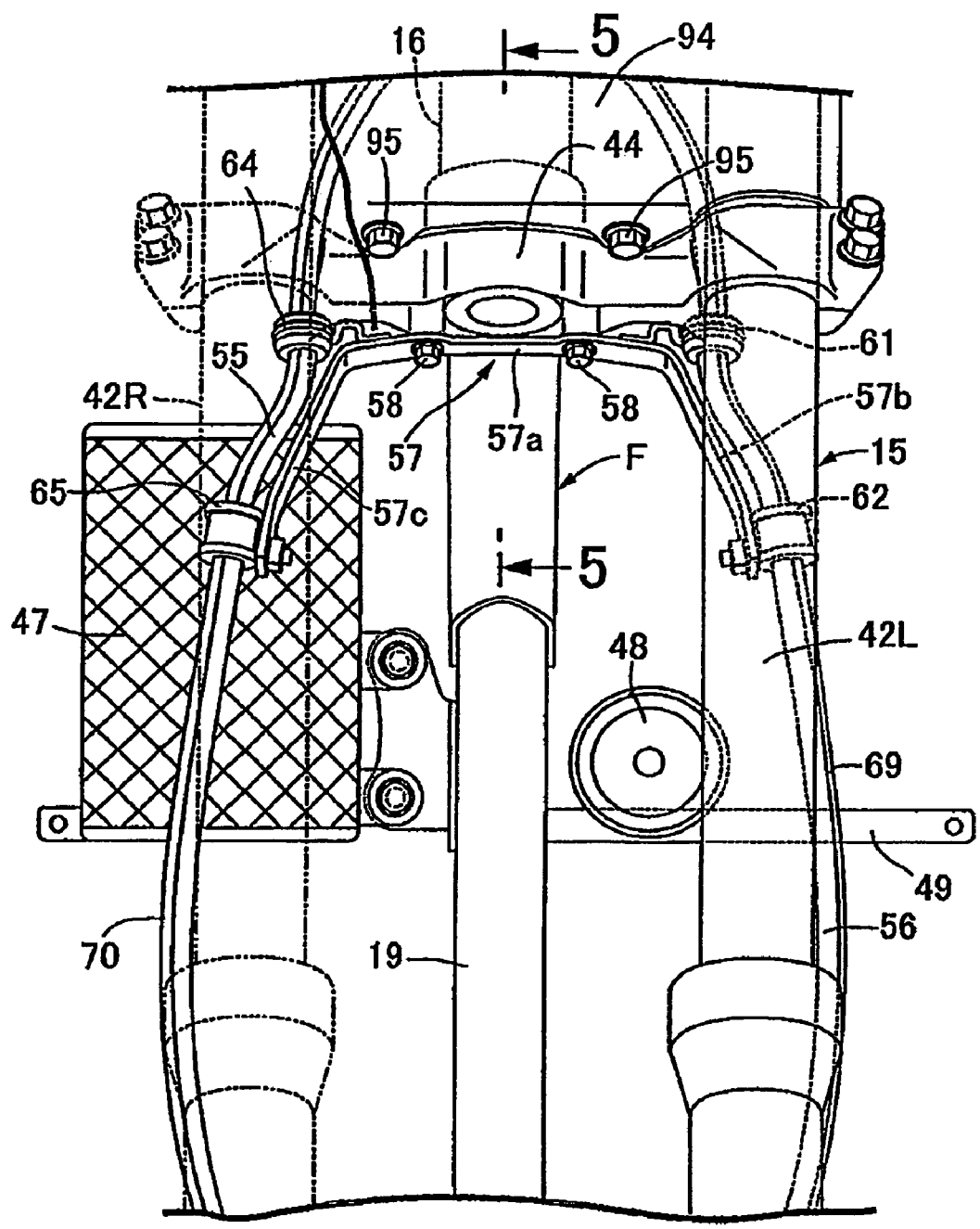
FIG. 4 is an enlarged detail view of a portion of the motorcycle viewed from a direction shown by an arrow 4 in FIG. 1.

As shown in FIGS. 3 and 4, the front fork 15 is configured by a pair of left and right telescopically formed shock absorbers 42L, 42R, arranged on both sides of the front wheel WF and extended vertically, a top bridge 43 (see FIGS. 1 and 2) that couples upper ends of both shock absorbers 42L, 42R and a bottom bridge 44 that couples upper portions of both shock absorbers 42L, 42R below the top bridge 43. The front wheel WF is supported between lower ends of both shock absorbers 42L, 42R by a shaft. A steering handlebar 45 is fixed to the top bridge 43 at a center portion of the top bridge 43 in a lateral direction.

A lower fender 46 that covers the front wheel WF from above is provided between both shock absorbers 42L, 42R under the bottom bridge 44. A pair of left and right supporting parts 46a, 46b attached to both shock absorbers 42L, 42R, and a cover 46c provided between the supporting parts 46a, 46b to cover the front wheel WF from above are integrated to form the lower fender 46, and are formed of material having synthetic resin.

An oil cooler 47 is arranged in front of the engine body 24. The oil cooler is attached to the down pipe 19 on the right side thereof. A horn 48 is arranged on the reverse side to the oil cooler 47 with the down pipe 19 in the center. The horn is supported by a supporting stay 49 fastened to the down pipe 19.

A caliper 50 of a disc brake BF for a front wheel installed on the left side of the front wheel WF is attached to a lower portion of the left shock absorber 42L. The disc brake BF for the front wheel is in a normal brake condition, in which braking force is exercised according to the operation of a brake lever 51 pivotally attached to the right side of the steering handlebar 45 and is turned in an interlock brake condition in which the brakes are applied in interlock with a disc brake BR for a rear wheel installed on the rear wheel WR when a brake pedal 52 pivotally supported by the right lower pipe 20 of the body frame F is pressed.

In other words, a brake hose 55 for a normal brake that conducts hydraulic pressure from a master cylinder 53 attached to the steering handlebar 45 so as to exercise braking hydraulic pressure according to the operation of the brake lever 51, and a brake hose 56 for an interlock brake that conducts hydraulic pressure from a master cylinder 54 (see FIG. 10) attached to the lower portion of the right center pipe 18 of the body frame F so as to exercise braking hydraulic pressure according to the operation of the brake pedal 52 are connected to the caliper 50 of the disc brake BF for the front wheel WF.

Figure 5:
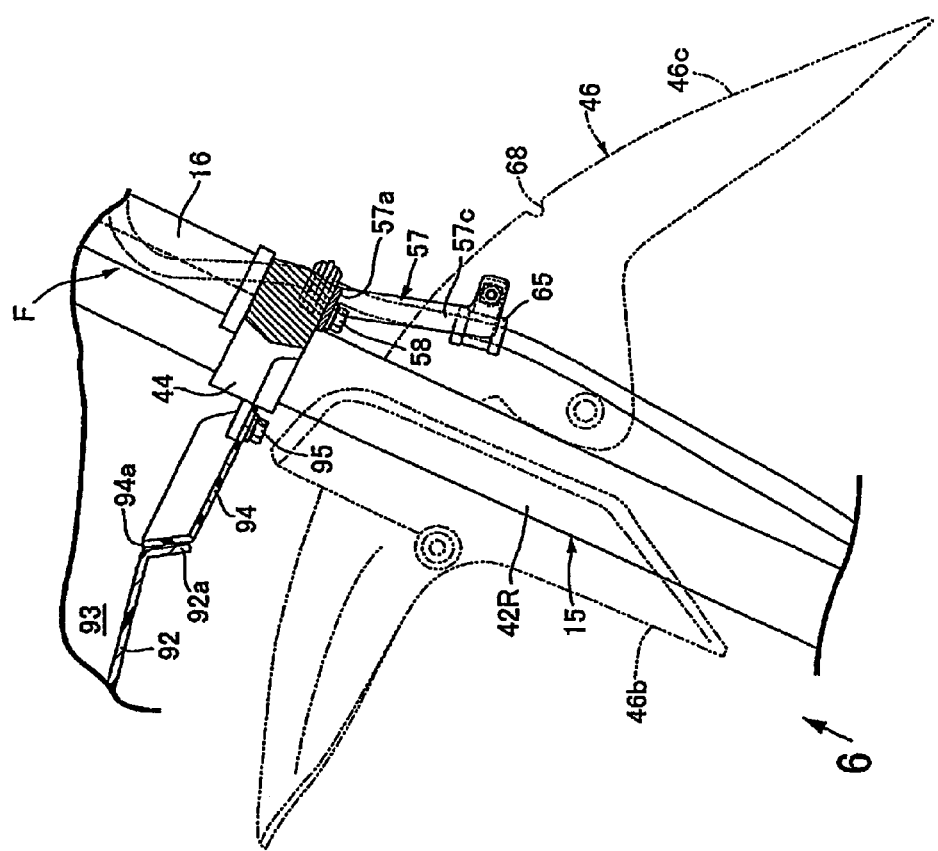
FIG. 5 is a sectional view of a portion of the motorcycle, taken along a line 5-5 in FIG. 4.
Figure 6:
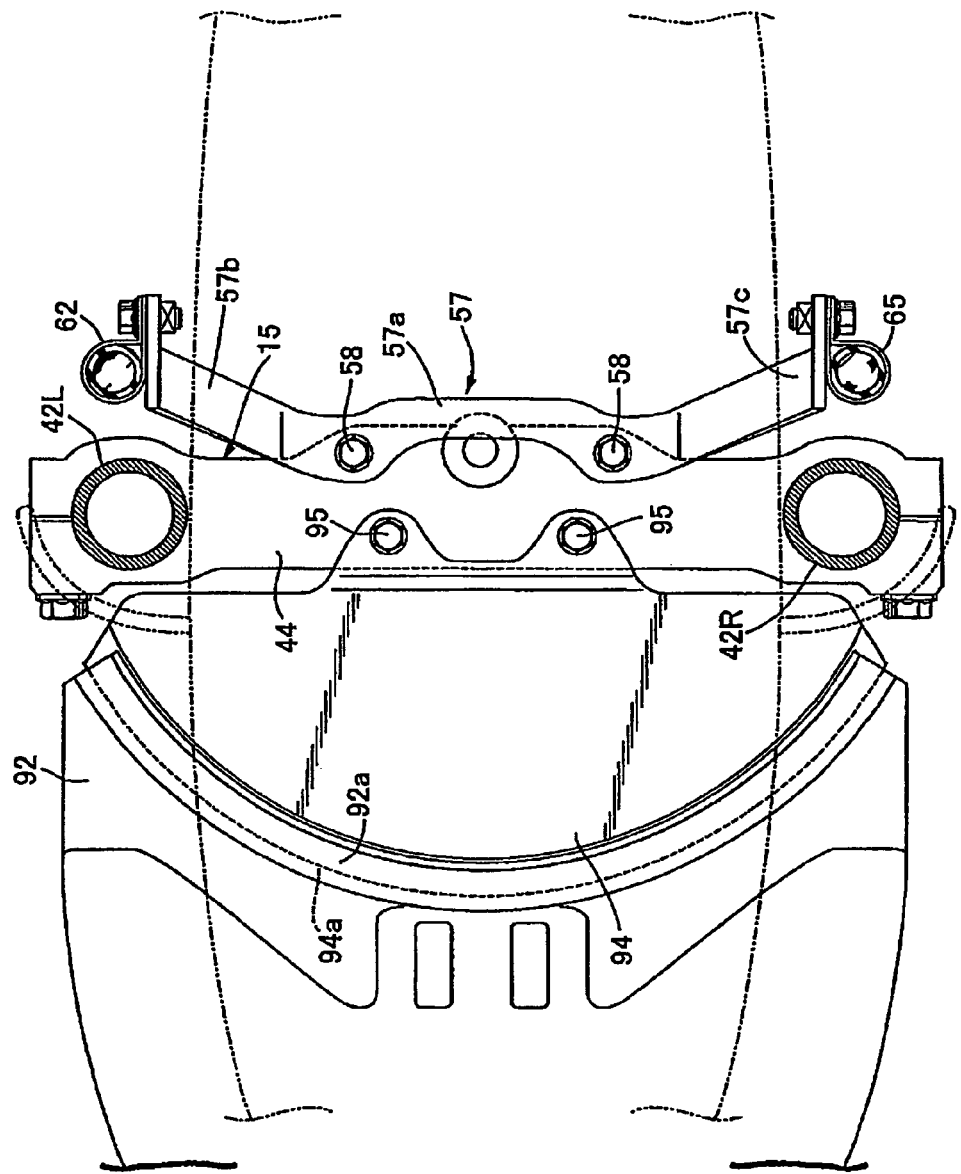
FIG. 6 is an enlarged detail view of a portion of the motorcycle viewed from a direction shown by an arrow 6 in FIG. 5.

As also shown in FIGS. 5 and 6, a stay 57 is attached to a bottom portion of the bottom bridge 44 in the front fork 15. A mounting plate 57a fastened to a bottom portion of the bottom bridge 44 using a pair of bolts 58, and a pair of left and right supporting plates 57b, 57c integrated with both ends of the mounting plate 57a and extended downwardly are integrated to form the stay 57. Both the supporting plates 57b, 57c are inclined so that an interval therebetween is wider downwardly.

In other words, the stay 57 is formed in the shape of a trapezoid made wider downwardly so as to avoid interference with the cover 46c, and to straddle the cover 46c when the shock absorbers 42L, 42R of the front fork 15 are most reduced and the cover 46c of the lower fender 46 is brought closest to the bottom bridge 44 as shown by a chain (dotted) line in FIG. 5.

In addition, second and fifth clamping members 62, 65 are attached to lower ends of the supporting plates 57b, 57c of the stay 57. However, the second and fifth clamping members 62, 65 are never touched to the cover 46c or do not interfere with the cover though they are overlapped with the cover 46c of the lower fender 46 in a side view when the cover 46c of the lower fender 46 is located closest to the bottom bridge 44.

A first clamping member 61 is fixed to a top face at a left end of the mounting plate 57a of the stay 57. A second clamping member 62 is attached to the lower end of the left supporting plate 57b of the stay 57 such that the second clamping member 62 located below the first clamping member 61, and a third clamping member 63 (see FIG. 1) located below the second clamping member 62 are attached to the left side of the lower fender 46.

The brake hose 56 for the interlock brake is vertically extended at a rear of the left shock absorber 42L with the brake hose inserted, and held into/by the first through third clamping members 61, 62, 63, and a lower end of the brake hose 56 for the interlock brake is connected to the caliper 50 arranged on the left side of the front wheel WF.

A fourth clamping member 64 is fixed to a top face at a right end of the mounting plate 57a of the stay 57. A fifth clamping member 65 is attached to the lower end of the right supporting plate 57c out of both the supporting plates 57b, 57c of the stay 57 such that the fifth clamping member 65 located below the fourth clamping member 64. A sixth clamping member 66 (see FIG. 2) located below the fifth clamping member 65 is attached to the right side of the lower fender 46. The brake hose 55 for the normal brake is vertically extended at a rear of the right shock absorber 42R such that the brake hose inserted and held into/by the fourth to the sixth clamping members 64, 65, 66.

A bend holding member 67 is attached to the right shock absorber 42R below the sixth clamping member 66. A bent part bent upwardly below the sixth clamping member 66 of the brake hose 55 for the normal brake is held by the bend holding member 67. In addition, the brake hose 55 for the normal brake extended upwardly from the bend holding member 67, which is fitted into a fitting concave portion 68 (see FIGS. 2 and 5) provided to an upper portion of the lower fender 46 at the back of the front fork 15, is extended on the right side of the front wheel WF, and is connected to the caliper 50.

A rotary speed sensor for ABS (not shown) that detects the rotary (revolution) speed of the front wheel WF is attached to the left side of the front wheel WF to execute antilock brake control. A cable 69 connected to the rotary speed sensor for ABS is inserted and held into/by the first through the third clamping members 61, 62, 63 together with the brake hose 56 for the interlock brake.

Further, a wheel speed sensor (not shown) is attached to the right side of the front wheel WF. A cable 70 connected to the wheel speed sensor is inserted and held into/by the fourth through the sixth clamping members 64, 65, 66 together with the brake hose 55 for the normal brake.

An intake system 71 is connected to a rear side wall of the cylinder head 28 in the engine body 24. The intake system is provided with a carburetor 73 an air cleaner 74. A downstream end of the carburetor 73 is connected to the cylinder head 28 via an intake pipe 72. An air cleaner 74 is arranged at the back of the carburetor 73 and connected to an upstream end of the carburetor 73.

An exhaust system 75 is connected to a front side wall of the cylinder head 28. The exhaust system 75 is provided with a first exhaust pipe 76, a second exhaust pipe 77 and a muffler 78. An upstream end of the first exhaust pipe 76 is connected to the cylinder head 28. An upstream end of the second exhaust pipe 77 is connected to a downstream end of the first exhaust pipe 76. The muffler 78 connected to a downstream end of the second exhaust pipe 77.

The first exhaust pipe 76 is curved such that it is extended rearwardly on the right side of the cylinder block 27 from the front side wall of the cylinder head 28, the second exhaust pipe 77 is extended rearwardly through the inside of the right center pipe 18 of the body frame F and the inside of the right rear stay 23, and the downstream end of the second exhaust pipe 77 is connected to the muffler 78 extended rearwardly and upward on the right upside of the rear wheel WR.

A muffler cover 79 is attached to the muffler 78 to cover the muffler 78 from above and the outside. A muffler cover 79a has a substantially L-type cross section. The muffler 78 and the muffler cover 79 combiningly, in collaboration for a muffler assembly 80. The muffler assembly 80 is arranged on the right side of the rear wheel WR.

As shown in FIG. 2, a connected part of the first and second exhaust pipes 76, 77 is covered with a protector 81 from the side. The protector 81 is fastened to the first and second exhaust pipes 76, 77. In addition, the protector 81 is integrated with a rearwardly extended part 81a (see FIG. 2) extended to the vicinity of the center pipe 18 of the body frame F. A clutch cable 82 vertically extended and arranged on the right side of the rear of the engine body 24 is covered with the rearwardly extended part 81a from the outside.

The lower fender 46, attached to the front fork 15, is covered with the upper cover 85 from above.

As previously noted, the fuel tank 40 is mounted on the main pipe 17 of the body frame F. The fuel tank 40 is disposed behind the head pipe 16 at a position above the engine body 24. At least a portion of the fuel tank 40 is covered by a pair of left and right cowls 96L, 96R. In the depicted embodiment, the left and right cowls 96L, 96R cover the front of the fuel tank 40 from the side, and the cowls range from rear portions on both sides of the upper cover 85.

Figure 7:
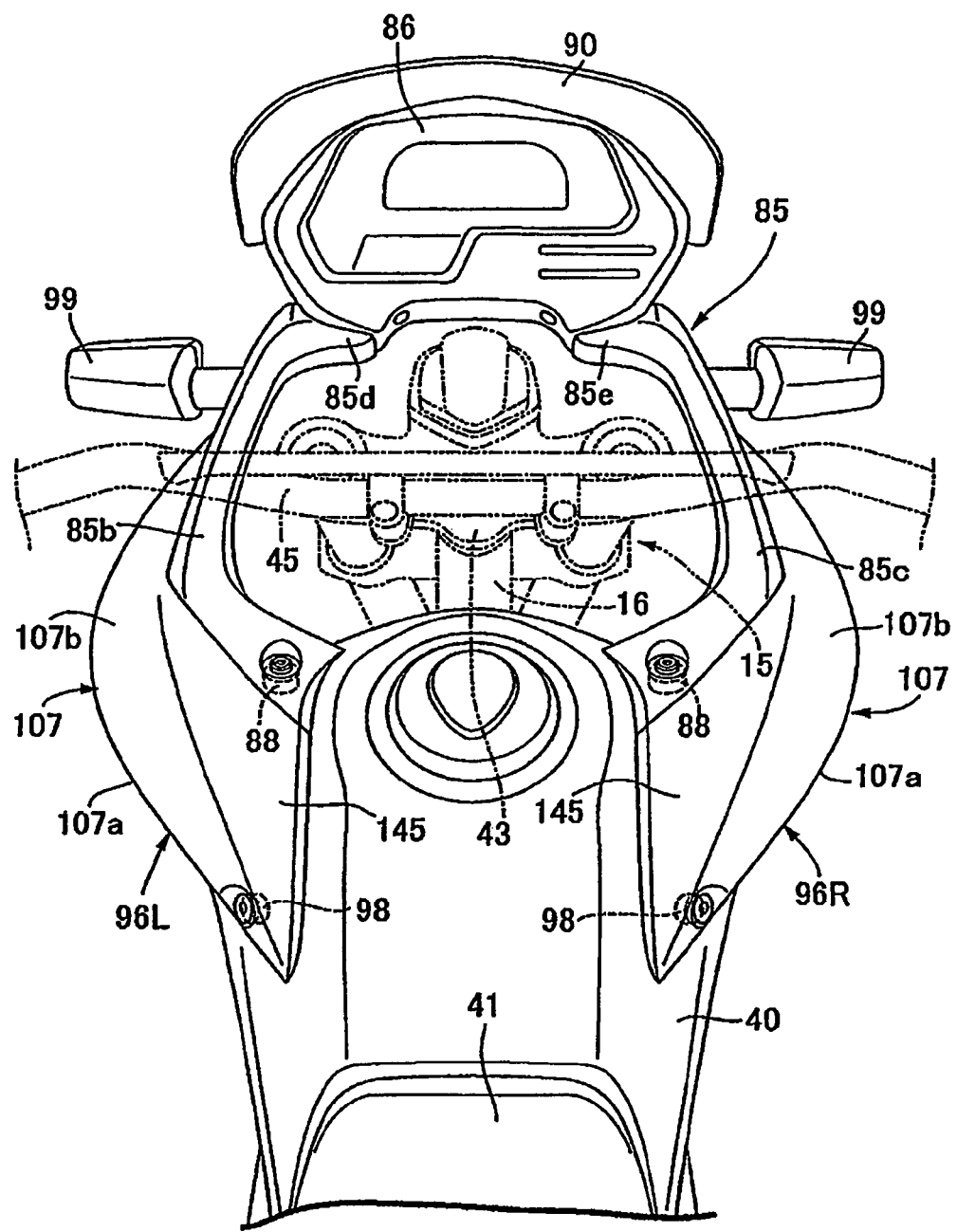
FIG. 7 is an enlarged detail view of a portion of the motorcycle viewed from a direction shown by an arrow 7 in FIG. 1.

As also shown in FIG. 7, the front 85a of the upper cover 85 is formed in a shape of a beak, when viewed in a side view, with the upper cover extended in front of and above the lower fender 46, the front portion 85a arranged in front of the head pipe 16 and a pair of the left and right side portions 85b, 85c extended rearwardly on both sides of the front portion 85a are integrated.

The fronts of both side portions 85b, 85c (formed to cover the front of the fuel tank 40 from the side) are fixed to a stay 87, fastened to the front of the head pipe 16. Rear ends of both side portions 85b, 85c are fixed to supporting members 88 fastened to both sides of the front of the fuel tank 40.

An upper portion of the upper cover 85 is open rearwardly substantially in a U-shape, and a lower portion of a windscreen 90 that covers a headlight 89 is inserted into an open part of the front portion 85a from above.

In other words, the lower portion of the windscreen 90 and the upper portion of the upper cover front end 85a are arranged such that they are overlapped, when viewed in a side view. In addition, the windscreen 90 is supported by the stay 87, which is fastened to the front of the head pipe 16.

An instrument cluster 86 is arranged at the rear of the windscreen 90. The instrument cluster is covered with the windscreen 90 protruded upwardly from an upper portion on the front side of the upper cover 85. The instrument cluster 86 is also supported by the stay 87. As seen best in FIG. 7, the upper cover 85 also includes a pair of integrally formed projections 85d, 85e which extend inwardly thereon below the instrument cluster 86. Each of the projections 85d, 85e is integrated with each intermediate portion of the respective side portions 85b, 85c of the upper cover 85. Each of the projections 85d, 85e is arranged at the same level as each lower portion on both sides of the instrument cluster 86. A respective concave portion 91 is formed on each side of the windscreen 90, extending rearwardly and upwardly from areas adjacent the lower corners of the headlight 89.

As shown in FIGS. 5 and 6, a concave portion 93 is formed in the front portion 85a of the upper cover 85, so as to house the lower portion of the windscreen 90. The concave portion 93 opens upwardly, so as to touch the bottom of the windscreen 90 using a bottom plate 92 ranging in a body from the front portion 85a as a lower closed end. A mud guard 94 is attached to the bottom bridge 44 of the front fork 15 by plural bolts 95, and the mud guard 94 extends forwardly toward the bottom plate 92.

In addition, a rear arc wall 92a is integrated with a rear edge of the bottom plate 92. The rear arc wall 92a extends rearwardly and downwardly from the bottom plate 92, in the shape of a concave circular arc, with the axis of the head pipe 16 in the center thereof. A front arc wall 94a is integrated with a front portion of the mud guard 94. The front arc wall 94a of the mud guard extends forwardly and upwardly opposite to the rear arc wall 92a of the bottom plate from the rear side, and is formed in the shape of a convex circular arc with the axis of the head pipe 16 in the center thereof.

During operation of the motorcycle, mud and other contaminants, which may be splashed up into the upper cover 85 by the front wheel WF, are prevented from being scattered at the back of the head pipe 16 through the upper cover 85 upwardly by the bottom plate 92 and the mud guard 94. An interval between the rear arc wall 92a and the front arc wall 94a is fixedly held by the steering operation of the steering handlebar 45, since the rear arc wall 92a at the rear edge of the bottom plate 92, and the front arc wall 94a, formed in the front of the mud guard 94 opposite to the rear arc wall 92a from the rear side, cooperate to define a circular arc with the axis of the head pipe 16 in the center.

The left and right cowls 96L, 96R are detachably attached to the upper cover 85 with a portion of each cowl overlapped with a lower portion on the rear side of each side portions 85b, 85c of the upper cover 85. The shrouds 97L, 97R that cover the oil cooler 47 attached to the down pipe 19 from the side are respectively coupled to the cowls 96L, 96R.

An upper portion of each cowl 96L, 96R is arranged at a position below the rear side of each of the side portions 85b, 85c of the upper cover 85 with the upper portion overlapped from the outside, the rear of each cowl 96L, 96R is fixed to each stay 98 fastened to the side of the fuel tank 40, and the front of each cowl 96L, 96R is fixed to the stay 87 fastened to the head pipe 16. Each turn signal lamp 99 protruded sideways from the front of each cowl 96L, 96R is attached to the stay 87 fastened to the head pipe 16.

Figure 8:
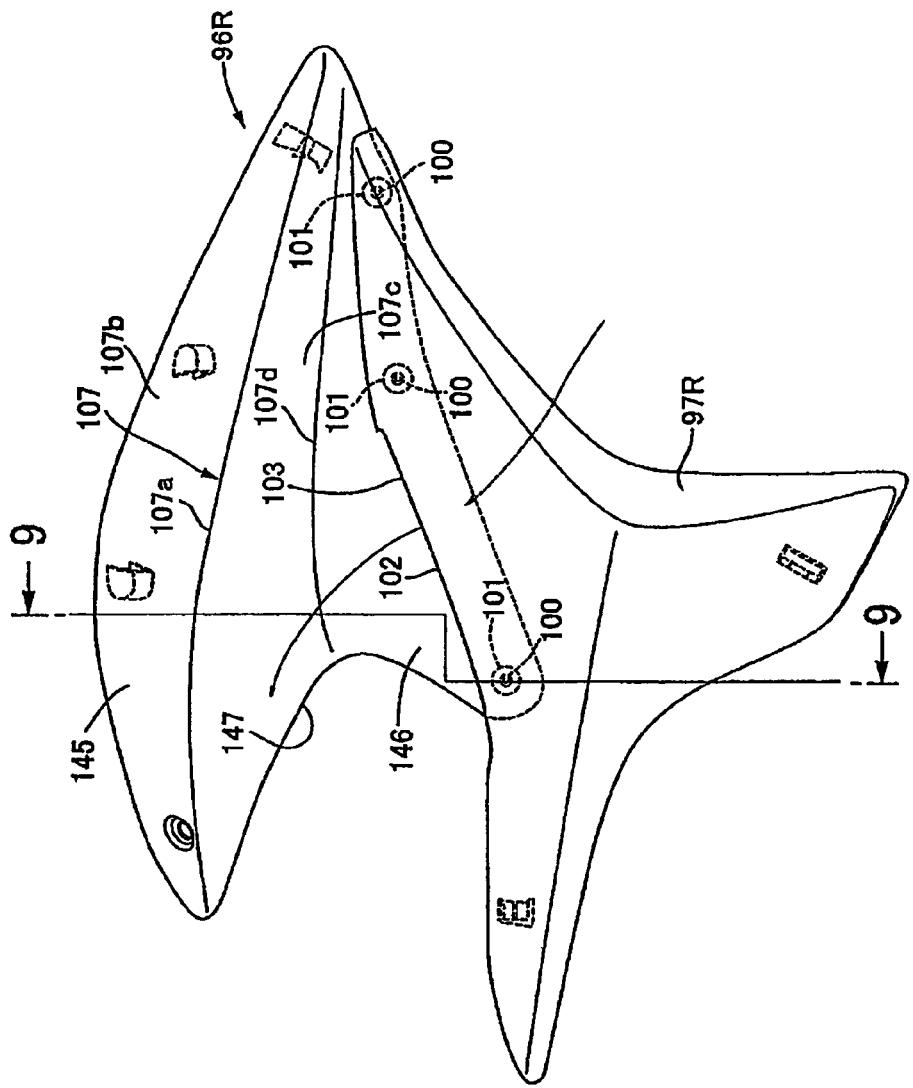
FIG. 8 is a side view showing a cowl and a shroud.

As shown in FIG. 8, the right cowl 96R is configured by integrating an upper extended portion 145 extended rearwardly from an intermediate portion in a longitudinal direction of the upper cover 85 towards an area above a rider's knee on the seat 41, and a lower extended portion 146 extended at the rear of the oil cooler 47 from the intermediate portion in the longitudinal direction of the upper cover 85, and when viewed in a side view, forming a substantially V-type concave portion 147 open rearwardly between the rear of the upper extended portion 145 and the lower extended portion.

Figure 9:
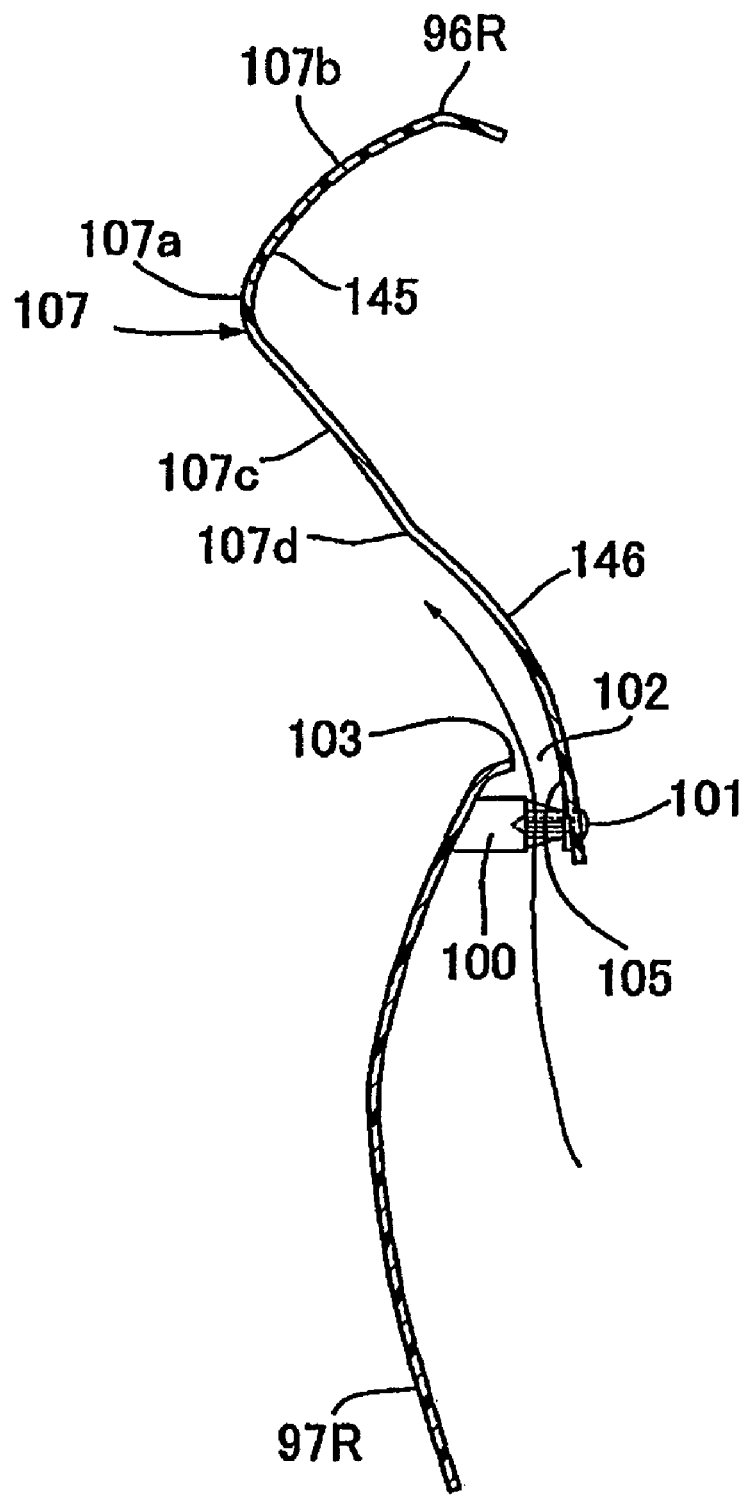
FIG. 9 is a sectional view of a portion of the motorcycle viewed along a line 9-9 in FIG. 8.

The right cowl 96R and the right shroud 97R are coupled such that an upper portion of the shroud 97R is overlapped with a lower portion of the right cowl 96R from the outside. The upper portion of the right shroud 97R is coupled to the lower portion of the right cowl 96R by touching the surface of the lower portion of the right cowl 96R to ends of plural bosses 100. For example, as shown in FIG. 9, three bosses 100 integrated with the surface of the upper portion of the shroud 97R and protruded on the side of the right cowl 96R, and screws 101 are inserted into the lower portion of the right cowl 96R from the side of the back to each boss.

In addition, an airflow routing groove 105 extended in the longitudinal direction and open downwardly is formed between the lower portion on the rear side of the right cowl 96R and the upper portion of the shroud 97R. A cutout 103 forming an exhaust port 102 vertically directed along the airflow routing groove 105 between the upper portion of the shroud 97R and the lower portion of the right cowl 96R is formed at the upper portion of the shroud 97R.

A rear of the shroud 97R is attached to a stay 104 (see FIG. 2) fastened to the side of the rear of the fuel tank 40 and a lower portion of the shroud 97R is attached to the oil cooler 47.

The left cowl 96L and the left shroud 97L are configured in a similar way as the right cowl 96R and the right shroud 97R. However, a lower portion of the left shroud 97L is attached to the supporting stay 49 fastened to the down pipe 19 with the horn 48 supported.

Each overhanging portion 107 which forms each ridge line portion 107a linearly ranging to a lower edge of the upper cover 85, when viewed in a side view, and a cross section of which is substantially V-type is provided with the right cowl 96R and the left cowl 96L such that the overhanging portion extends outside in the vehicle-width direction.

As for each overhanging portion 107, an upper inclined portion 107b inclined to be located on above toward the inside in the vehicle-width direction, and extended to an upper portion on the front side of the fuel tank 40 and a lower inclined portion 107c inclined to be located on the downside toward the inside in the vehicle-width direction and extended to a lower portion on the front side of the fuel tank 40 are formed on above and on the downside of the ridge line portion 107a, and they are respectively provided to the cowls 96L, 96R.

In addition, a bent line 107d bent with the bent line protruded outward in the vehicle-width direction and extended in the longitudinal direction is formed in an intermediate portion of the lower inclined portion 107c on a boundary of the upper extended portion 145 and the lower extended portion 146, and a portion located at a position lower than the bent line 107d in the lower inclined portion 107c is abruptly inclined inwardly in the vehicle-width direction, compared with a portion located at a position higher than the bent line 107d.

Figure 10:
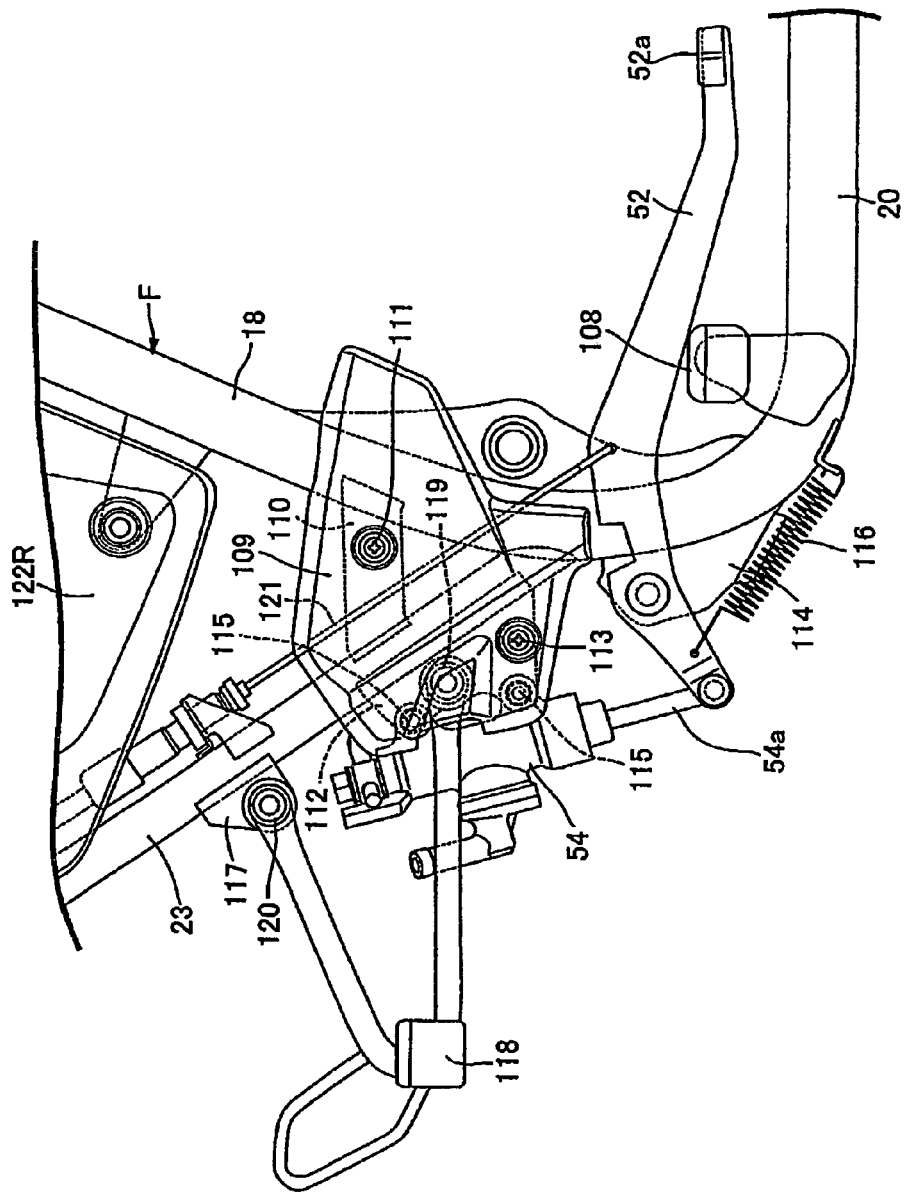
FIG. 10 is an enlarged detail view of a portion of the motorcycle viewed from a direction shown by an arrow 10 in FIG. 2.

As shown in FIG. 10, a step 108 is provided with the rear of each lower pipe 20 for enabling the rider seated on the seat 41 to put his/her foot thereon. From the outside, a portion in which each center pipe 18 and each rear stay 23 are linked is covered with each heel guard 109 which is opposite to a heel of the foot put on each step 108 from the inside. Each heel guard 109 is fastened to a corresponding coupling pipe 110 that couples lower portions of each center pipe 18 and each rear stay 23 by each screw 111, and is fastened to corresponding bracket 112 provided at a rear face of the lower portion of each rear stay 23 by each screw 113.

An intermediate portion of the brake pedal 52 provided with a pedal part 52a at one end is pivotally supported by a supporting plate 114 fastened to a rear face of the lower end of the right center pipe 18 below the bracket 112, and the other end of the brake pedal 52 is coupled to a piston rod 54a of the master cylinder 54 attached to the bracket 112 by a pair of bolts 115. A return spring 116 is provided between a rear end of the lower pipe 20 and the brake pedal 52.

Further, each pillion step 118 is fastened to the bracket 112 and a bracket 117 provided to the rear face of each rear stay 23 above the bracket 112 by bolts 119, 120. The heel guard 109 covers the bracket 112 that supports the master cylinder 54 and also covers a cable 121 having one end thereof coupled to the brake pedal 52 to connect to a brake switch (not shown) and which is extended rearwardly and upwardly along each rear stay 23.

Both sides of the seat rails 21 and the rear stays 23 of the body frame F located below the seat 41 are covered with a pair of left and right rear side covers 122L, 122R. On one side in a lateral direction of the rear wheel WR, for example, on the right side in this embodiment, the muffler assembly 80 including the muffler 78 which is arranged on the downside of the right rear side cover 122R out of both rear side covers 122L, 122R, an upper edge of which is along a lower edge of the right rear side cover 122R and which is extended in the longitudinal direction with the muffler inclined rearwardly and upward and the muffler cover 79 covering the muffler 78 from above and from the outside and having a substantially L-type cross section is arranged.

Figure 11:
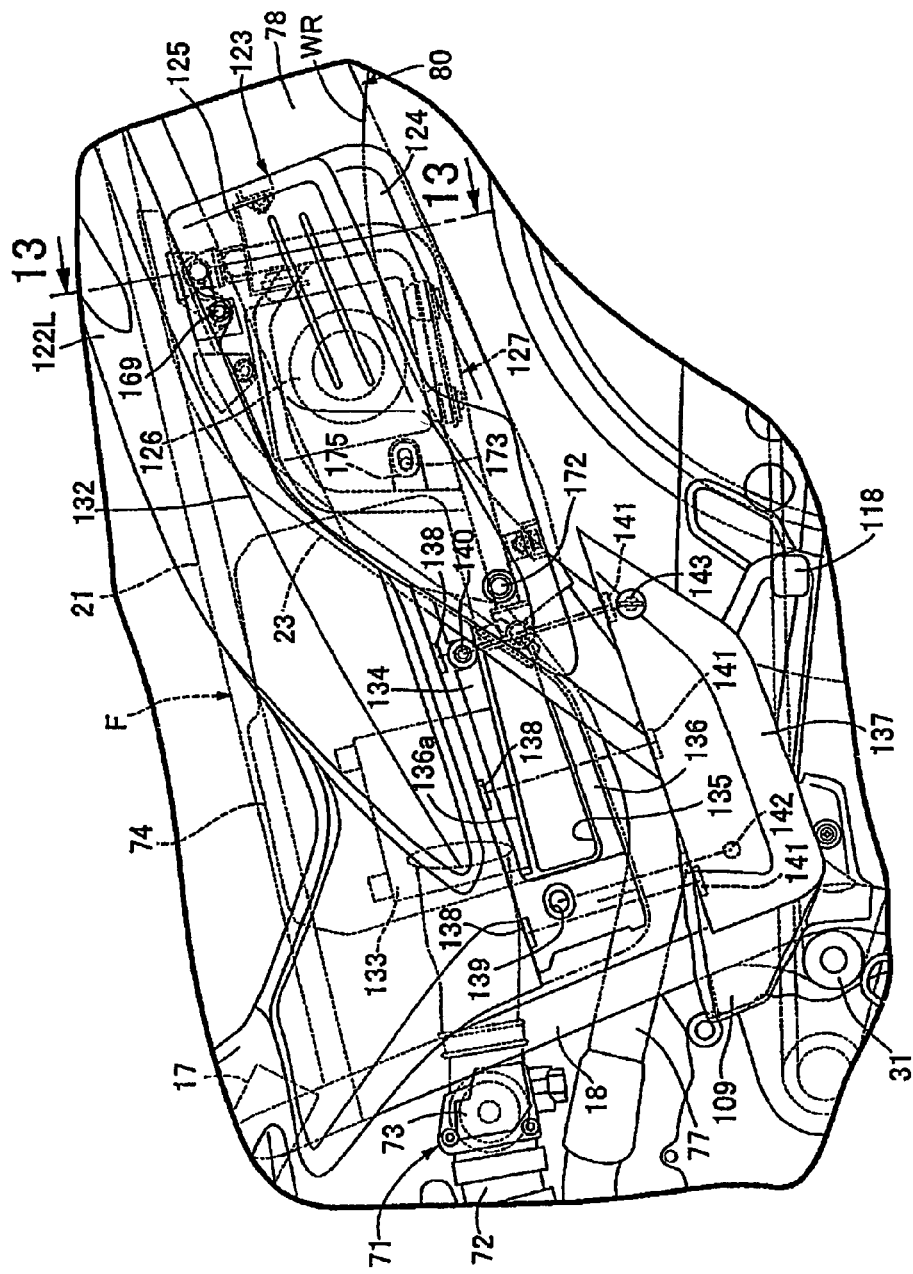
FIG. 11 is an enlarged detail view of a portion of the motorcycle viewed from a direction shown by an arrow 11 in FIG. 1.

On the other side in the lateral direction of the rear wheel WR, for example, on the left side of the rear wheel WR in the illustrative embodiment, as shown in FIGS. 1 and 11, a single housing box 123 having a shape similar to the muffler assembly 80 and forming a pseudo muffler assembly 80 is extended in the longitudinal direction on the downside of the left rear side cover 122L substantially in parallel with the muffler assembly 80.

Figure 12:
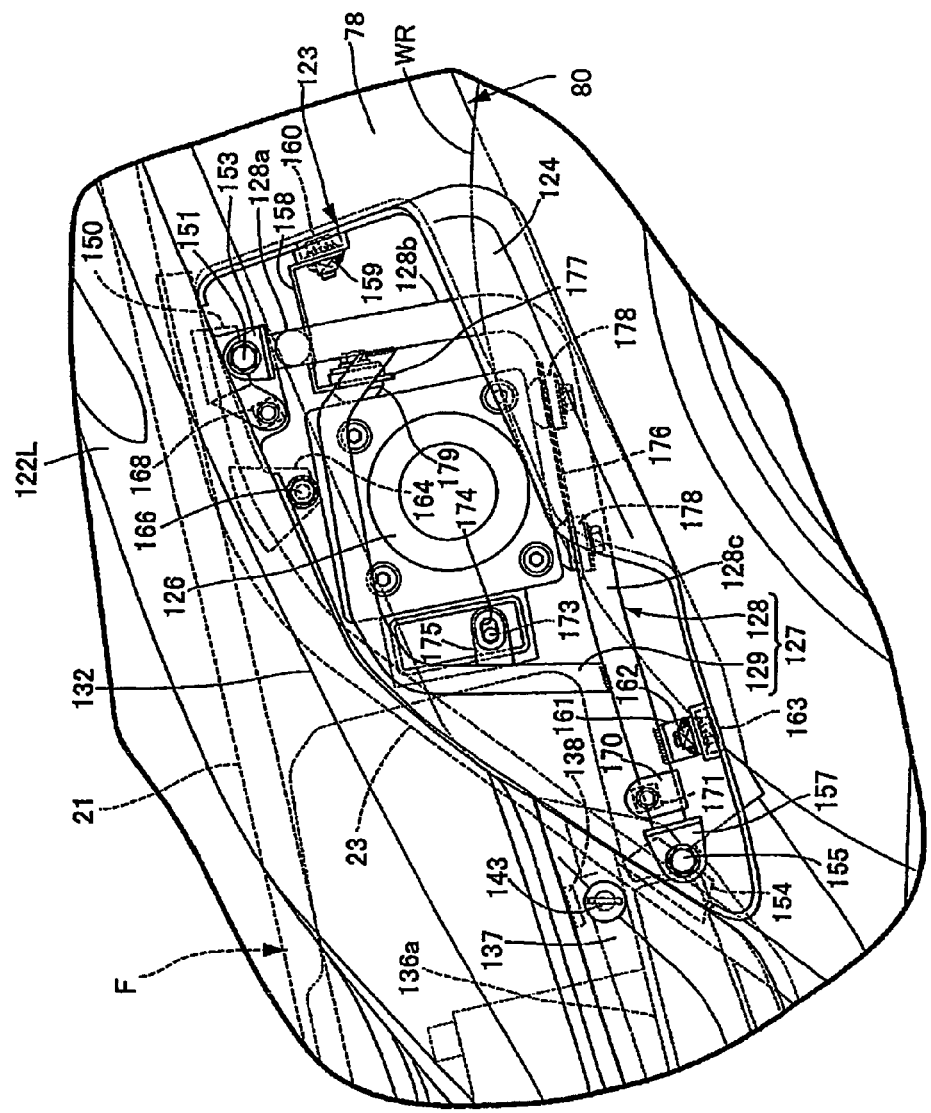
FIG. 12 is a side view showing the vicinity of a housing box, a lid of which is removed for purposes of illustration.
Figure 13:
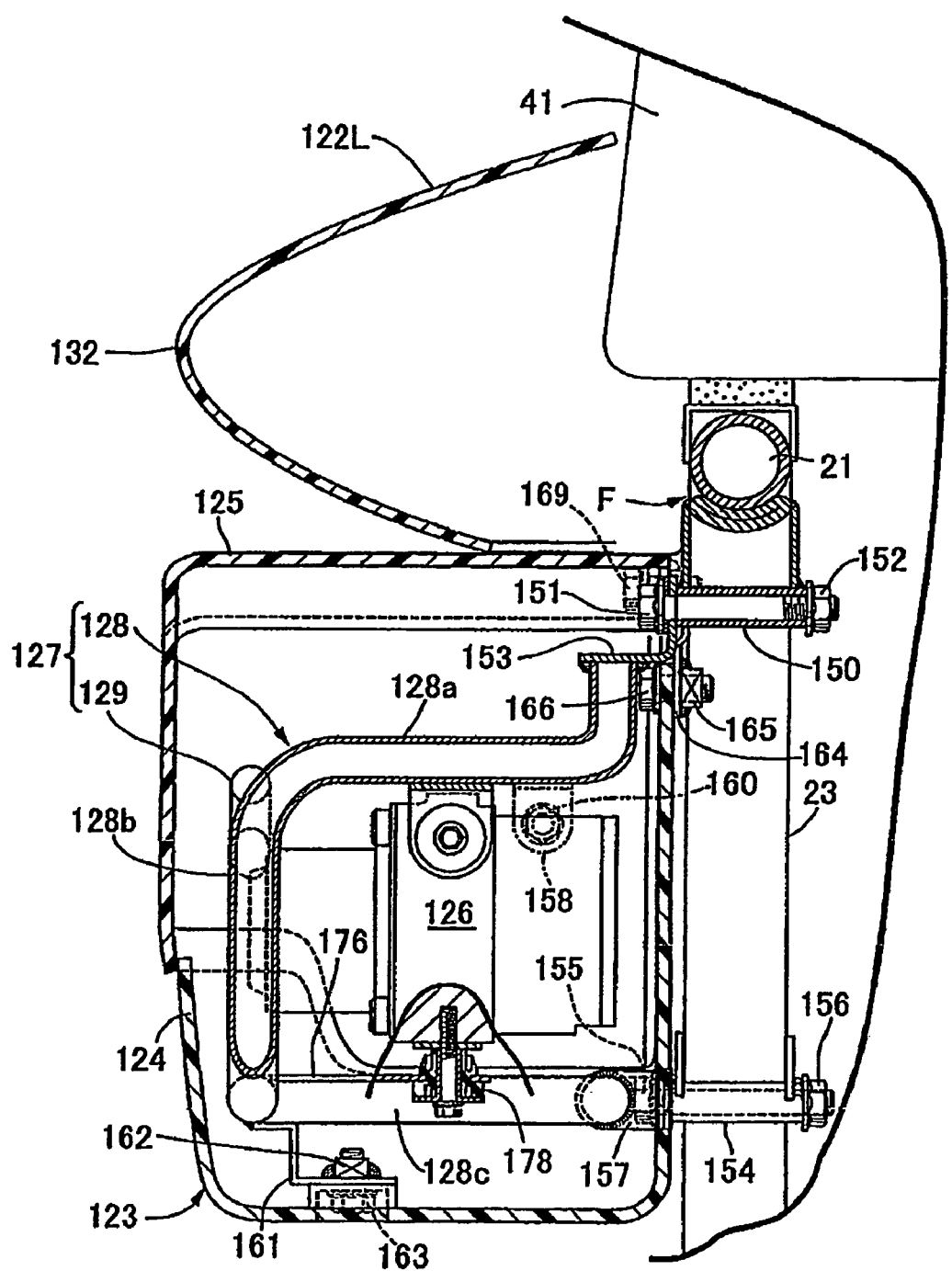
FIG. 13 is a sectional view of a portion of the motorcycle taken along a line 13-13 in FIG. 11.

As also shown in FIGS. 12 and 13, the housing box 123 is configured by a body 124 of the box and a lid 125 that closes an opening of the box body 124. Above the box body 124 is open upwardly and outwardly. The housing box is supported by the left rear stay 23 of the body frame F and a guard 127 attached to the rear stay 23. The lid 125 has the same color as the muffler cover 79 and is formed substantially in the same shape as the muffler cover 79.

The guard 127 is formed by connecting first and second frames 128, 129 configured by a bent metallic pipe. A first mounting plate 153 fastened to a bracket 150 provided at a rear end of the left rear stay 23 by bolts 151, 152 is provided at one end of the first frame 128. At the other end of the first frame 128, a second mounting plate 157 is fastened to a bracket 154 provided in an intermediate portion of the rear stay 23 by bolts 155, 156 on top of mounted positions of the pillion steps 118.

The first frame 128 is configured by an upper frame portion 128a, an intermediate frame portion 128b and a lower frame portion 128c. The first mounting plate 153 is provided at an inner end of the upper frame portion 128a. The upper frame portion 128a is extended outwardly at a slightly lower position from the first mounting plate 153. The intermediate frame portion 128b is extended downwardly from an outer end of the upper frame portion 128a. The lower frame portion 128c is extended forwardly from a lower end of the intermediate frame portion 128b. The second mounting plate 157 is arranged at a front end of the intermediate frame portion 128b. A portion in front of an intermediate portion of the lower frame portion 128c is inclined inwardly in the vehicle-width direction toward the front.

The second frame 129 is bent substantially in an L-type shape. Both the ends of the second frame 129 are connected to an upper portion of the intermediate frame portion 128b of the first frame 128 and the intermediate portion of the lower frame portion 128c of the first frame 128 by welding and others.

A supporting plate 158 opposite to a side wall of the rear of the box body 124 from the front side is provided to the upper frame portion 128a in the guard 127 and a bolt 160 that pierces the side wall of the rear of the box body 124 and the supporting plate 158 from the outside of the box body 124 is screwed to a weld nut 159 fastened to the supporting plate 158.

A supporting plate 161 opposite to a bottom wall of the front of the box body 124 from above is provided with the front of the lower frame portion 128c in the guard 127 and a bolt 163 that pierces a bottom wall of the front of the box body 124 and the supporting plate 161 from the downside of the box body 124 is screwed to a weld nut 162 fastened to the supporting plate 161.

Further, a stay 164 opposite to an upper portion of the box body 124 from the side of the body frame F is provided to the left rear stay 23 in front of the bracket 150 and a bolt 166 that pierces the box body 124 and the stay 164 from the inside of the box body 124 is screwed to a weld nut 165 fastened to the stay 164.

In other words, the box body 124 is supported by the guard 127 attached to the left rear stay 23 of the body frame F with the guard housed in the box body 124 and the left rear stay 23.

A cross section of the lid 125 is formed substantially in an L-type shape to close the opening of the box body 124. The lid is detachably attached to the left rear stay 23 and the guard 127 such that the lid can be attached/detached in the vehicle-width direction.

In other words, a weld nut 168 is fastened to the bracket 150 provided with the left rear stay 23. A bolt 169 that pierces an upper portion of the lid 125 and the bracket 150 is screwed to the weld nut 168. A stay 170 to which a weld nut 171 is fastened is provided at the front of the lower frame portion 128c in the guard 127. A bolt 172 that pierces the front of the lid 125 and the stay 170 is screwed to the weld nut 171.

A positioning member 175 having a fitting hole 174 formed therein which a positioning projection 173 protruded inside the lid 125 is fitted with the front of the second frame 129 in the guard 127.

Braking force produced by the disc brake BF for the front wheel and the disc brake BR for the rear wheel so as to avoid a situation that the front wheel WF and the rear wheel WR are locked when the disc brake BF for the front wheel and the disc brake BR for the rear wheel are operated is controlled by a single ABS modulator 126 common to the disc brake BF for the front wheel and the disc brake BR for the rear wheel.

The ABS modulator 126 is arranged at least on one side in the lateral direction of the rear wheel WR, for example, on the left side of the rear wheel WR in this embodiment, i.e., on the downside of a passenger seated on the rear of the tandem seat 41 and at the back of a passenger's foot put on the pillion step 118. The ABS modulator 126 is housed in the housing box 123.

In addition, in the housing box 123, the guard 127 is housed and the ABS modulator 126 is attached to the guard 127. In other words, a lower portion of the ABS modulator 126 is attached to a supporting plate 176 provided with the lower frame portion 128c in the guard 127 via two pieces of mounting rubber 178, for example. The rear side of the ABS modulator 126 is attached to a supporting plate 177 provided with the intermediate frame portion 128b in the guard 127 via mounting rubber 179.

In addition, a portion of the first frame 128 and the second frame 129 in the guard 127 are arranged outside the ABS modulator 126 attached to the guard 127 and the ABS modulator 126 is attached to the guard 127 with the ABS modulator protected by the guard housed in the housing box 123.

The rear side covers 122L, 122R include overhanging portions 132 extending sideways from upper portions thereof for providing widened space for accommodating both legs of the passenger to prevent the legs from approaching the rear wheel WR when the passenger seated on the rear of the tandem seat 41 puts both legs on the pillion steps 118. Particularly, the overhanging portion 132 of the right rear side cover 122R fulfills a function to prevent the right leg of the passenger from approaching the muffler 78.

A box-type glove compartment 136 is fixed on the left side of the air cleaner 74. The box-type glove compartment 136 opens leftwardly. The box-type glove compartment 136 includes a housing 134 that houses a battery 133, and a tool housing 135 arranged on the downside of the housing 134 via a partition 136a between the housing 134 and the tool housing 135.

The left rear side cover 122L is formed to cover an upper portion of the glove compartment 136. A lid plate 137 openably closes the tool housing 135 is tightly connected to a lower portion of the left rear side cover 122L. A contour in which the left rear side cover 122L and the lid plate 137 are combined is equivalent to a contour corresponding to the right rear side cover 122R.

Three fitting holes 138 arranged in the longitudinal direction on above the tool housing 135, a concave portion 139 arranged in front of the tool housing 135 and a tapped hole 140 arranged on above the rear of the tool housing 135 are provided to the lower portion of the left rear side cover 122L. Further, fitting projections 141 fitted into each fitting hole 138 and a fitting projection 142 positioned and fitted into the concave portion 139 are protruded from the lid plate 137 and a screw 143 screwed into the tapped hole 140 is pivotally installed.

Next, explanation of the action of the illustrative embodiment is provided.

The body cover structure includes the upper cover 85 that covers the lower fender 46 which is attached to the front fork 15 and which covers the front wheel WF from above further on above covers a portion of the fuel tank 40 at rear ends on both sides from the side. Each overhanging portion 107 in which each ridge line portion 107a linearly ranging to the lower edge of the upper cover 85, when viewed in a side view, is formed in the left and right cowls 96L, 96R detachably tightly connected to the upper cover 85 with a part of each cowl overlapped with the rear of the upper cover 85 and the cross section of which is substantially V-type extends outside in the vehicle-width direction.

Therefore, the upper cover 85 and the cowls 96L, 96R range, forming a streamline shape, the appearance quality can be enhanced, the effect of rectification for smoothly conducting running wind rearwardly can be acquired, and, during operation of the motorcycle, air resistance can be reduced.

During operation, running wind that gets inside the cowls 96L, 96R and the shrouds 97L, 97R can be rectified by the airflow routing grooves 105, because each cowl 96L, 96R and each shroud 97L, 97R that covers the oil cooler 47 attached to the front of the body frame F from the side are mutually coupled with the upper portion of each shroud 97L, 97R overlapped with the lower portion on the rear side of each cowl 96L, 96R from the side and the airflow routing groove 105 extended in the longitudinal direction and open downwardly is formed between the lower portion of each cowl 96L, 96R and the upper portion of each shroud 97L, 97R, In addition, the cutout 103 that forms the exhaust port 102 ranging with the airflow routing groove 105 and vertically directed between each shroud and the lower portion on the rear side of each cowl 96L, 96R is provided to the upper portion of each shroud 97L, 97R, the exhaust port 102 can be easily formed between the lower portion on the rear side of each cowl 96L, 96R and the upper portion of each shroud 97L, 97R with simple configuration that the cutout 103 is only provided to the upper portion of each shroud 97L, 97R, a part of running wind that gets inside the cowls 96L, 96R and the shrouds 97L, 97R is exhausted on the downsides of the shrouds 97L, 97R, and residual running wind can be exhausted upward from each exhaust port 102.

As each overhanging portion 107 is provided to each cowl 96L, 96R by vertically forming each upper inclined portion 107b inclined to be located on above toward the inside in the vehicle-width direction and extended to the upper portion on the front side of the fuel tank 40 and each lower inclined portion 107c inclined to be located on the downside toward the inside in the vehicle-width direction and extended to the lower portion on the front side of the fuel tank 40 on above and on the downside of each ridge line portion 107a, rider's comfort can be enhanced by effectively conducting running wind on the side of the rider along each upper inclined portion 107b, vertically separating the running wind in each overhanging portion 107 and enhancing the effect of rectification, and as the effect of rectification can be acquired in each overhanging portion 107 of each cowl 96L, 96R even if the shrouds 97L, 97R are removed, various appearance can be enjoyed.

As the bent line 107d bent with the bent line protruded outward in the vehicle-width direction and extended in the longitudinal direction is formed in the intermediate portion of the lower inclined portion 107c and the part lower than the bent line 107d of the lower inclined portion 107c is abruptly inclined inward in the vehicle-width direction, compared with the part higher than the bent line 107d, air on above the exhaust port 102 is guided by the part lower than the bent line 107d of the lower inclined portion 107c and is conducted outside in the vehicle-width direction as shown in FIG. 9, and the air exhausted from the exhaust port 102 can be prevented from hitting on the rider seated on the seat 41.

Further, running wind is conducted on the side of the rider by the concave portions 91 and the comfort of the rider can be enhanced, since the windscreen 90 extends upwardly from the upper portion of the upper cover 85, and the concave portions 91 extend rearwardly and upwardly on both sides of the windscreen 90.

As both sides of the body frame F are covered with the pair of left and right rear side covers 122L, 112R on the downside of the seat 41, the muffler assembly 80 including the single muffler 78 arranged under the right rear side cover 122R and extended in the longitudinal direction and the muffler cover 79 covering the muffler 78 from above and from the outside, and having the substantially L-type cross section is arranged on the right side of the rear wheel WR and the single housing box 123 having the similar shape to the muffler assembly 80 and forming the pseudo muffler assembly 80 is arranged on the left side of the rear wheel WR substantially in parallel with the muffler assembly 80 with the housing box extended in the longitudinal direction under the left rear side cover 122L, the vicinity of the rear of the vehicle body is prevented from being bulky because of the housing box and the promptness can be enhanced.

Besides, as the muffler assembly 80 and the housing box 123 respectively having the similar shape are arranged in the lateral direction of the rear wheel WR, the effect of rectification of running wind can be equalized in the lateral direction of the motorcycle, further, as the housing box 123 looks the muffler assembly 80, the appearance like twin mufflers can be acquired, and the suitable motorcycle for a sport type can be provided.

As the lid 125 that configures the housing box 123 in collaboration with the box body 124 covers the opening of the box body 124 detachably in the vehicle-width direction, the left rear side cover 122L located on above the housing box 123 never obstructs the attachment/detachment of the lid 125 and work for attaching/detaching the lid 125 can be facilitated.

Since the box body 124 is formed with the upper portion open upward and outward and the cross section of the lid 125 is formed substantially in the L type to close the opening of the box body 124, the opening of the box body 124 when the lid 125 is removed is enlarged, and work for housing a housed article in the housing box 123 and work for removing it can be facilitated.

In addition, as the lid 125 has the same color as the muffler cover 79 and has the substantially same shape as the muffler cover 79, the housing box 123 looks the muffler assembly 80 and the appearance like twin mufflers can be more acquired.

Since the ABS modulator 126 is arranged at least on one side in the lateral direction of the rear wheel WR, on the left side of the rear wheel WR in this embodiment so as to prevent the front wheel WF and the rear wheel WR from being locked when the disc brake BF for the front wheel and the disc brake BR for the rear wheel are operated, the ABS modulator 126 is arranged in dead space, a degree of freedom in layout is enhanced, and the vehicle body can be also configured compactly by the arrangement of the ABS modulator 126.

In addition, as the ABS modulator 126 is housed in the housing box 123, the ABS modulator 126 is hidden, the appearance quality is enhanced, and the ABS modulator 126 can be protected.

Since the guard 127 which protects the ABS modulator 126 and which is housed in the housing box 123 is attached to the left rear stay 23 in the rear of the body frame F and the ABS modulator 126 is attached to the guard 127, the ABS modulator 126 is protected by the guard 127 that also fulfills a function as a bracket via which the ABS modulator 126 is supported by the body frame F.

Since a position in which the ABS modulator 126 is mounted can be adjusted by changing the shape of the guard 127, a degree of freedom in the layout of the ABS modulator 126 in the housing box 123 can be enhanced and in addition, as the guard 127 is housed in the housing box 123 together with the ABS modulator 126, the appearance quality can be also made excellent.

As the ABS modulator 126 is arranged on the downside of the passenger seated on the rear of the tandem seat 41 and at the back of the passenger's foot put on each pillion step 118, the ABS modulator 126 can be prevented from hitting on the passenger's foot. In addition, as the muffler 78 and the ABS modulator 126 are arranged on both sides of the rear wheel WR, the weight on the side of the housing box 123 is made close to the weight on the side of the muffler assembly 80 and the lateral weight balance can be improved.

The selected embodiment of the present invention has been described, however, the present invention is not limited to the described embodiment, and various design changes may be made without deviating from the present invention described in the claims. In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. In a motorcycle having a body frame including a front fork steerably supported by a head pipe at a front end of the body frame, a fuel tank operatively attached to an upper portion of the body frame behind the head pipe, and a front wheel rotatably attached to the front fork, the improvement comprising a body cover structure comprising:

an upper cover member arranged at a position above the front wheel, said upper cover member being operatively attached to the front end of the body frame, the upper cover member comprising a bottom plate having a rear edge portion formed with a concave arcuate shape which is coaxial with a central axis of the head pipe;

a mud guard extending between said bottom plate and said front fork, said mud guard being attached to said front fork so as to be movable therewith, the mud guard having a front edge portion formed with a convex arcuate shape which is coaxial with the central axis of the head pipe; and a pair of right and left cowls provided for covering at least a portion of the fuel tank from each left and right side, respectively;

wherein the mud guard and the bottom plate cooperate to substantially shield an operator of the vehicle from mud splashed up by the front wheel during operation of the motorcycle, while maintaining an interval between the front edge portion of the mud guard and the rear edge portion of the bottom plate during steering of the motorcycle, due to the corresponding coaxial shapes thereof:

wherein the upper cover member is formed with a rear portion on each side thereof configured and arranged to cover at least part of the fuel tank from each side; and wherein each of the cowls comprises an overhanging portion including a ridge line portion linearly ranging to a lower edge of the upper cover member in a side view, said cowls being detachably connected to the upper cover member with a part of each cowl overlapped with a rear portion of the upper cover member, wherein the overhanging portion extends outside of the upper cover member in a vehicle-width direction.

2. The body cover structure of the motorcycle according to claim 1, further comprising a pair of left and right shrouds respectively disposed adjacent to the cowls;

wherein each cowl is detachably attached to the rear portion of the upper cover member and at least one of said shrouds covers an oil cooler attached to the front of the body frame, and an upper portion of each shroud is overlapped with a lower portion on the rear side of a corresponding cowl from the outside; and wherein the cowls and shrouds are configured such that an airflow routing passage is defined between a lower rear portion of each cowl and the upper portion of each shroud, said airflow routing passage extended in a longitudinal direction and opening downwardly.

3. The body cover structure of the motorcycle according to claim 2, wherein:

a cutout that forms said airflow routing passage is formed in an upper portion of each shroud, at least one boss is provided extending between the shroud and cowl on each side of the motorcycle, said boss spacing the shroud away from the cowl in the area of the airflow routing passage, and said airflow routing passage is vertically directed between the lower portion on the rear side of each cowl and the upper portion of each respective corresponding shroud.

4. The body cover structure of the motorcycle according to claim 3, wherein: the overhanging portion is formed by arranging an upper inclined portion inclined to be located above the ridge line portion and inclining from the ridge line portion toward the inside in the vehicle-width direction and extended to an upper portion on the front side of the fuel tank, and a lower inclined portion inclined to be located below the ridge line portion and inclining from the ridge line portion toward the inside in the vehicle-width direction and extended to a lower portion on the front side of the fuel tank, so that the overhanging portion has a substantially V-type cross section; and the overhanging portion is provided to each cowl.

5. The body cover structure of the motorcycle according to claim 3, wherein a headlight cover protrudes upwardly from an upper portion of the upper cover member; and wherein a respective concave portion is formed in the upper cover member on each side of the headlight cover, the concave portion extending rearwardly and upwardly thereon.

6. The body cover structure of the motorcycle according to claim 2, wherein: the overhanging portion is formed by arranging an upper inclined portion inclined to be located above the ridge line portion and inclining from the ridge line portion toward the inside in the vehicle-width direction and extended to an upper portion on the front side of the fuel tank, and a lower inclined portion inclined to be located below the ridge line portion and inclining from the ridge line portion toward the inside in the vehicle-width direction and extended to a lower portion on the front side of the fuel tank, so that the overhanging portion has a substantially V-type cross section; and the overhanging portion is provided to each cowl.

7. The body cover structure of the motorcycle according to claim 2, wherein a headlight cover protrudes upwardly from an upper portion of the upper cover member; and wherein a respective concave portion is formed in the upper cover member on each side of the headlight cover, the concave portion extending rearwardly and upwardly thereon.

8. The body cover structure of the motorcycle according to claim 1, wherein: the overhanging portion is formed by arranging an upper inclined portion inclined to be located above the ridge line portion and inclining from the ridge line portion toward the inside in the vehicle-width direction and extended to an upper portion on the front side of the fuel tank, and a lower inclined portion inclined to be located below the ridge line portion and inclining from the ridge line portion toward the inside in the vehicle-width direction and extended to a lower portion on the front side of the fuel tank, so that the overhanging portion has a substantially V-type cross section; and the overhanging portion is provided to each cowl.

9. The body cover structure of the motorcycle according to claim 8, wherein a headlight cover protrudes upwardly from an upper portion of the upper cover member; and wherein a respective concave portion is formed in the upper cover member on each side of the headlight cover, the concave portion extending rearwardly and upwardly thereon.

10. The body cover structure of the motorcycle according to claim 1,
wherein a headlight cover protrudes upwardly from an upper portion of the upper cover member; and
wherein a respective concave portion is formed in the upper cover member on each side of the headlight cover, the concave portion extending rearwardly and upwardly thereon.

11. The body cover structure of the motorcycle according to claim 1, wherein the rear edge portion of the bottom plate comprises a rear arc wall extending downwardly thereon, and the front edge portion of the mud guard comprises a front arc wall extending upwardly thereon, the rear arc wall and the front arc wall being substantially aligned with one another.

12. In a motorcycle having a body frame including a front fork steerably supported by a head pipe at a front end of the body frame, a fuel tank operatively attached to an upper portion of the body frame behind the head pipe, and a front wheel rotatably attached to the front fork, the improvement comprising a body cover structure comprising:
an upper cover member arranged at a position above the front wheel, said upper cover member being operatively attached to the front end of the body frame;
a pair of right and left cowls provided for covering at least a portion of the fuel tank from each left and right side, respectively; and
a pair of left and right shrouds respectively disposed adjacent to the cowls and extending downwardly to an area below the cowls, wherein an open space is provided between the shroud and cowl on each side of the motorcycle to define a respective airflow routing passage;
wherein at least one boss is provided extending between the shroud and cowl on each side of the motorcycle, said boss spacing the shroud away from the cowl in the area of the airflow routing passage;
wherein the upper cover member is formed with a rear portion on each side thereof configured and arranged to cover at least part of the fuel tank from each side;
wherein each cowl is detachably attached to the rear portion of the upper cover member and at least one of said shrouds covers an oil cooler attached to the front of the body frame, and an upper portion of each shroud is overlapped with a lower portion on the rear side of a corresponding cowl from the outside; and
wherein the cowls and shrouds are configured such that the airflow routing passage is defined between a lower rear portion of each cowl and the upper portion of each respective corresponding shroud, said airflow routing passage extended in a longitudinal direction and opening downwardly.

13. The body cover structure of the motorcycle according to claim 12, wherein each of the cowls comprises an overhanging portion including a ridge line portion linearly ranging to a lower edge of the upper cover member in a side view, said cowls being detachably connected to the upper cover member with a part of each cowl overlapped with a rear portion of the upper cover member, wherein the overhanging portion extends outside of the upper cover member in a vehicle-width direction.

14. The body cover structure of the motorcycle according to claim 12, wherein:
a cutout that forms said airflow routing passage is formed in an upper portion of each shroud,
at least one boss is provided extending between the shroud and cowl on each side of the motorcycle, said boss spacing the shroud away from the cowl in the area of the airflow routing passage, and
said airflow routing passage is and vertically directed between the lower portion on the rear side of each cowl and the upper portion of each corresponding shroud, respectively.

15. The body cover structure of the motorcycle according to claim 12, wherein:
the overhanging portion is formed by arranging an upper inclined portion inclined to be located on above toward the inside in the vehicle-width direction and extended to an upper portion on the front side of the fuel tank and a lower inclined portion inclined to be located on the downside toward the inside in the vehicle-width direction and extended to a lower portion on the front side of the fuel tank on above and on the downside of the ridge line portion so that the overhanging portion has a substantially V-type cross section; and the overhanging portion is provided to each cowl.

16. The body cover structure of the motorcycle according to claim 12,
wherein a headlight cover protrudes upwardly from an upper portion of the upper cover member; and
wherein a respective concave portion is formed in the upper cover member on each side of the headlight cover, the concave portion extending rearwardly and upwardly thereon.

17. In a motorcycle having a body frame including a front fork steerably supported by a head pipe at a front end of the body frame, a fuel tank operatively attached to an upper portion of the body frame behind the head pipe, and a front wheel rotatably attached to the front fork, the improvement comprising a body cover structure comprising:
an upper cover member arranged at a position above the front wheel, said upper cover member being operatively attached to the front end of the body frame, the upper cover member comprising a bottom plate having a rear edge portion formed with a concave arcuate shape which is coaxial with a central axis of the head pipe;
a mud guard extending between said bottom plate and said front fork, said mud guard being attached to said front fork so as to be movable therewith, the mud guard having a front edge portion formed with a convex arcuate shape which is coaxial with the central axis of the head pipe; and
a pair of right and left cowls provided for covering at least a portion of the fuel tank from each left and right side, respectively,
wherein the mud guard and the bottom plate cooperate to substantially shield an operator of the vehicle from mud splashed up by the front wheel during operation of the motorcycle, while maintaining an interval between the front edge portion of the mud guard and the rear edge portion of the bottom plate during steering of the motorcycle, due to the corresponding coaxial shapes thereof,
each of the cowls comprising an overhanging portion including a ridge line portion linearly ranging to a lower edge of the upper cover member as seen in side view, said cowls being detachably connected to the upper cover member with a part of each cowl overlapped with a rear portion of the upper cover member, wherein the overhanging portion extends outside of the upper cover member in a vehicle-width direction; and a pair of left and right shrouds respectively disposed adjacent to the cowls and extending downwardly to an area below the cowls;

wherein the upper cover member is formed with a rear portion on each side thereof configured and arranged to cover at least part of the fuel tank from each side;

wherein each cowl is detachably attached to the rear portion of the upper cover member and at least one of said shrouds covers an oil cooler attached to the front of the body frame, and an upper portion of each shroud is overlapped with a lower portion on the rear side of a corresponding cowl from the outside; and wherein the cowls and shrouds are configured such that an airflow routing passage is defined between a lower rear portion of each cowl and the upper portion of each shroud, said airflow routing passage extended in a longitudinal direction and opening downwardly.

18. The body cover structure of the motorcycle according to claim 17, wherein:

a cutout that forms said airflow routing passage is formed in an upper portion of each shroud, at least one boss is provided extending between the shroud and cowl on each side of the motorcycle, said boss spacing the shroud away from the cowl in the area of the airflow routing passage, and said airflow routing passage is and vertically directed between the lower portion on the rear side of each cowl and the upper portion of each corresponding shroud, respectively.

19. The body cover structure of the motorcycle according to claim 17, wherein:

the overhanging portion is formed by arranging an upper inclined portion inclined to be located on above toward the inside in the vehicle-width direction and extended to an upper portion on the front side of the fuel tank and a lower inclined portion inclined to be located on the downside toward the inside in the vehicle-width direction and extended to a lower portion on the front side of the fuel tank on above and on the downside of the ridge line portion so that the overhanging portion has a substantially V-type cross section; and the overhanging portion is provided to each cowl.

20. The body cover structure of the motorcycle according to claim 17, wherein a headlight cover protrudes upwardly from an upper portion of the upper cover member; and wherein a respective concave portion is formed in the upper cover member on each side of the headlight cover, the concave portion extending rearwardly and upwardly thereon.

* * * * *